W. J. EDWARDS.
ANTISLIPPING DEVICE FOR TIRES.
APPLICATION FILED SEPT. 4, 1918.
1,308,057.
Patented July 1, 1919.
2 SHEETS—SHEET 1.
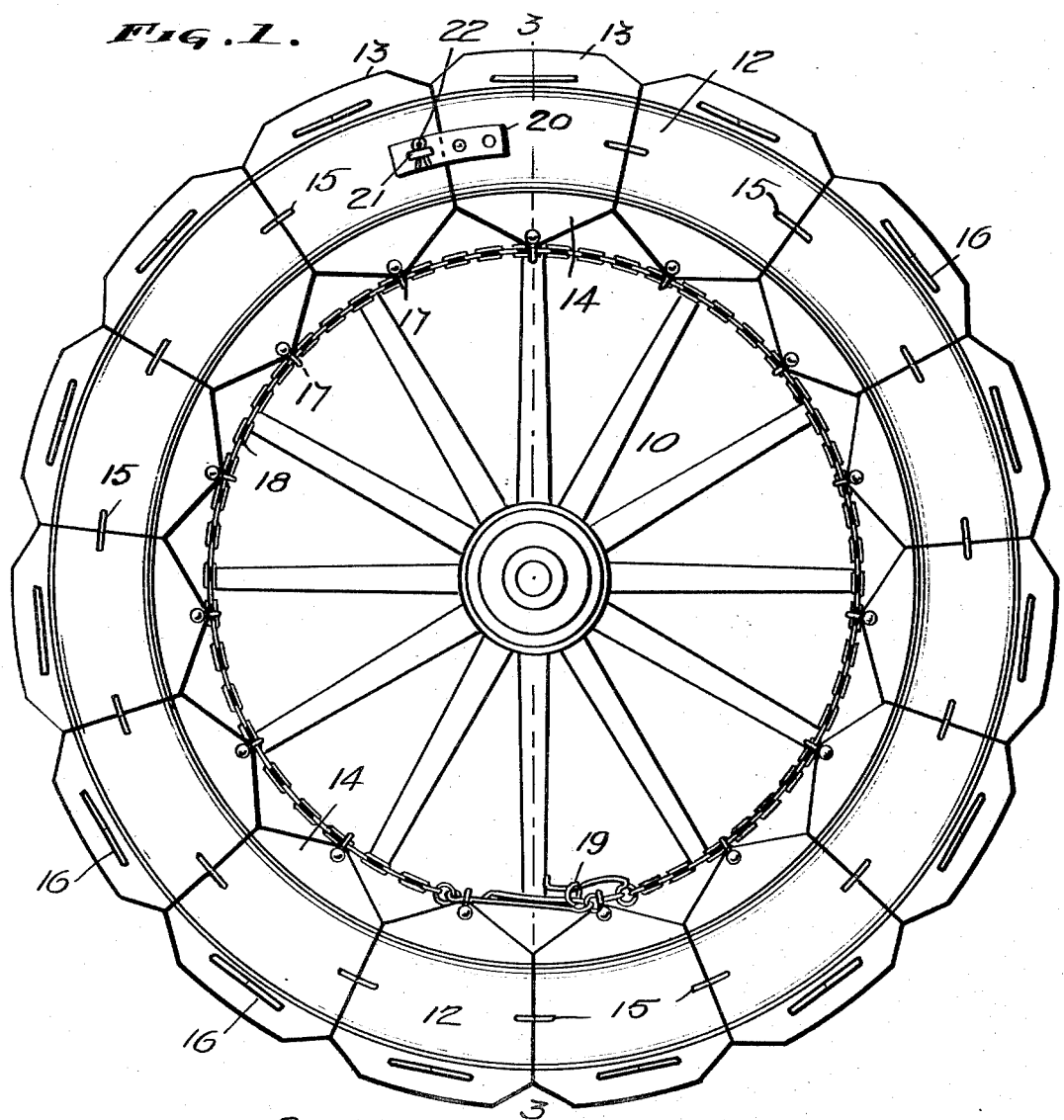
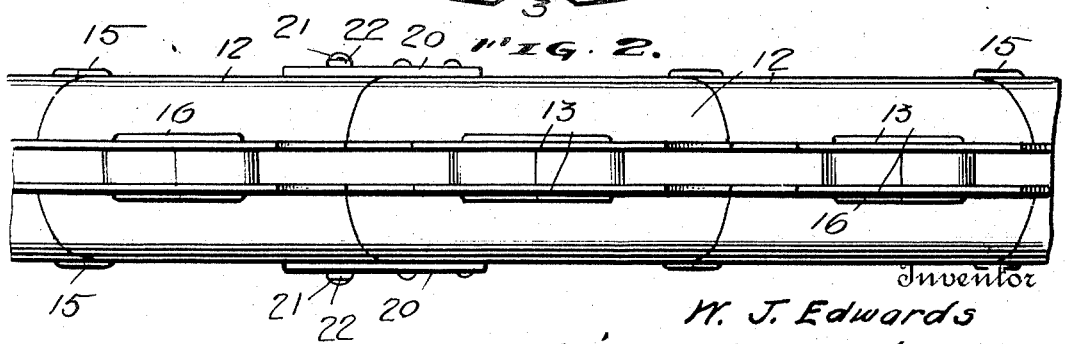
Inventor
W. J. Edwards
By
Attorneys

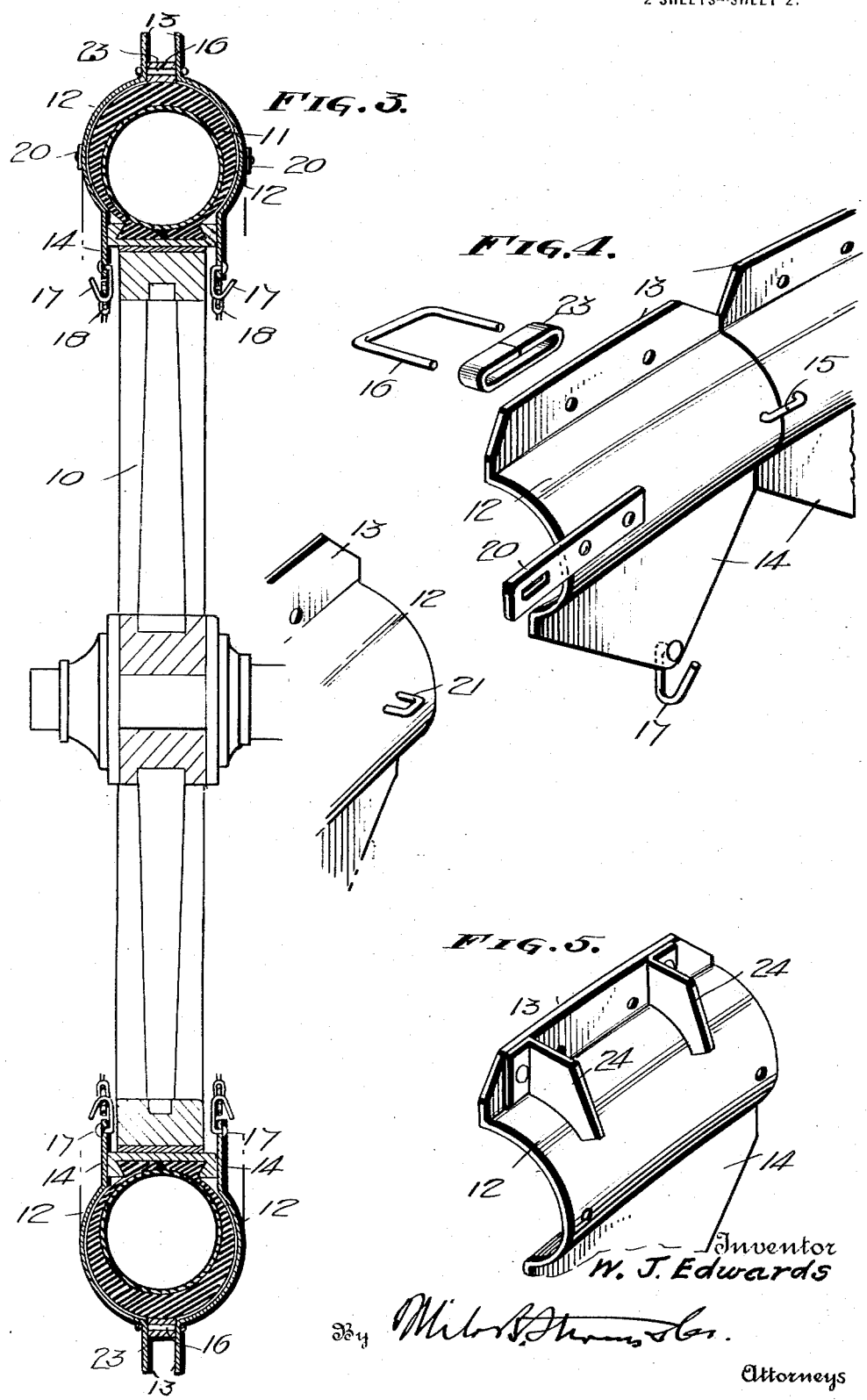

UNITED STATES PATENT OFFICE.

WILLIAM J. EDWARDS, OF FLUVANNA, TEXAS.

ANTISLIPPING DEVICE FOR TIRES.

1,308,057.  Specification of Letters Patent.  Patented July 1, 1919.

Application filed September 4, 1918. Serial No. 252,576.

*To all whom it may concern:*

Be it known that I, WILLIAM J. EDWARDS, a citizen of the United States, residing at Fluvanna, in the county of Scurry and State of Texas, have invented new and useful Improvements in Antislipping Devices for Tires, of which the following is a specification.

This invention relates to devices applicable to the tires of motor vehicles for preventing slipping thereof on bad roads when the tires do not take sufficient hold on the road, or where the road is slippery and the vehicle tends to skid.

The invention has for its object to provide a simple and efficient device of the kind stated, and also one which is strong and durable, and which can be easily applied to or removed from the wheels.

With the object stated in view, the invention consists in a novel combination and arrangement of parts to be hereinafter described and claimed, and in order that the same may be better understood, reference is had to the accompanying drawings forming a part of this specification.

In the drawings:

Figure 1 is an elevation of a wheel showing the application of the invention thereto;

Fig. 2 is a plan view of a fragment of the device;

Fig. 3 is a vertical section on the line 3—3 of Fig. 1;

Fig. 4 is a detail in perspective of certain parts of the device separated, and

Fig. 5 is a perspective view showing a modified structure.

Referring specifically to the drawings, 10 denotes a motor or other vehicle wheel equipped with a pneumatic or other tire 11. The invention is readily applicable to a wheel equipped with any kind of a tire, although it is primarily intended for wheels having pneumatic tires.

The anti-slipping device is composed of a series of metallic plates 12 which are linked together and arranged to form a flexible armor belt covering the tire 11. Each plate is curved to conform to the curvature of the side of the tire and also to extend for a short distance across the tread portion thereof. That portion of the plate which engages the tire tread has a straight outstanding flange 13, and at the base of the tire the plate is flat as shown at 14 and continued inward to come opposite the side of the wheel felly.

A series of plates 12, linked together in a manner to be presently described, is placed on each side of the tire 11 and when in place, the flanges 13 of the plates form a pair of practically continuous, laterally spaced antislipping flanges extending outward from the tread of the tire.

The plates 12 on each side of the tire 11 are loosely connected by links 15 passing through apertures in the ends of adjacent plates. There is also provided a connection between the plates on one side of the tire and those on the opposite side. This connection is made by links 16 passing through apertures in opposite flanges 13, it being understood that the plates are arranged in pairs, one member of a pair being on one side of the tire and the other member being directly opposite on the other side of the tire. This arrangement positions the flanges 13 so that the members of the pairs of plates can be connected across by the links 16.

At the middle of the inner portion 14 of each plate 12 is carried a hook 17 for engagement by a chain 18 which anchors the device on the wheel. A chain is located on each side of the wheel and arranged in a circle around the same, the ends of the chains being fastened together by an ordinary chain lock 19.

To facilitate the attachment of the device and the removal thereof, two adjacent plates 12 have a separable connection in the form of a tongue 20 on one plate, having an aperture through which passes a staple 21 on the other plate, with a split pin or other suitable fastening device 22 passing through the staple. This separable connection enables the endless belt-like structure formed by the flexibly connected plates 12 to be opened up for ready application to, or removal from the wheel similar to an ordinary anti-skid chain.

Those portions of the links 16 seating between the flanges 13 are covered by looped plates 23 to prevent dirt from packing in the same.

As the device almost completely covers the tire 11 it also serves as an armor therefor. It will be noted that the tire tread does not come in contact with the road surface at all, the portions of the plates 12 which cover the tread portion of the tire taking the wear. The flanges 13 enter the road and effectually prevent side slippage or skidding. For application to the rear or driving wheels of the vehicle, the plates 12 are provided with transverse traction spurs 24 extending outward from the outer sides of the flanges 13 and the tread portion of the plates 12. Fig. 5 illustrates this form of plates.

The spurs 24 augment the driving power of the wheels as they strike the road at right angles to the direction the wheels are turning, and this also prevents the wheels from spinning around in soft places in the road.

I claim:

An anti-slipping device for tires, comprising a series of plates linked together at their ends to form a flexible belt adapted to fit one side of the tire, and a similar belt for the opposite side of the tire, the plates constituting the belts having tread portions provided with outstanding flanges, the plates of one belt being opposite the plates of the other belt, and the flanges of opposite plates being laterally spaced, links seating between and connecting the flanges of opposite plates, and cover plates around said links between the flanges.

In testimony whereof I affix my signature.

WILLIAM J. EDWARDS.